Figure 1:
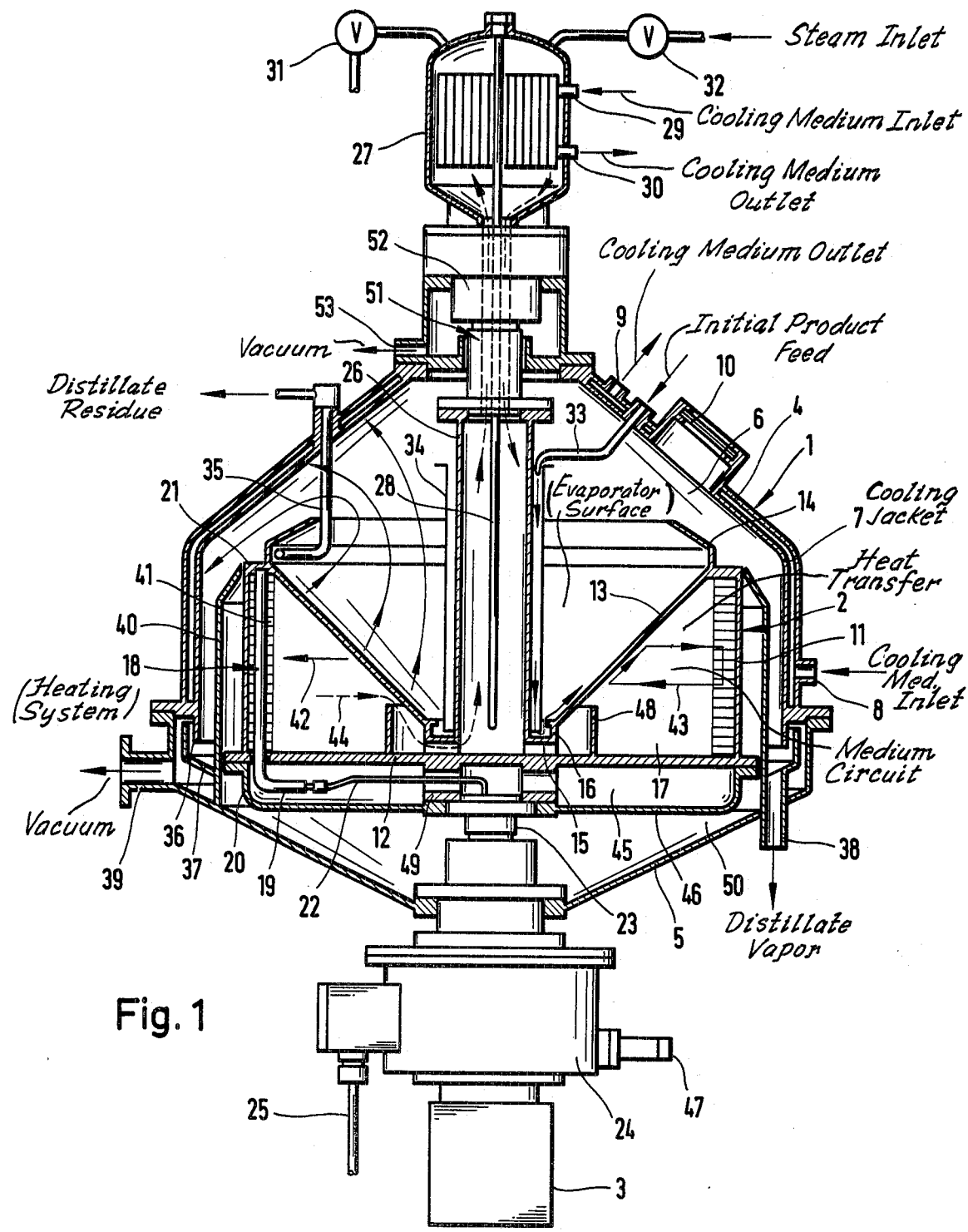

United States Patent [19]

Feres

[11] 4,167,454
[45] Sep. 11, 1979

[54] EVAPORATOR

[76] Inventor: Vaclav Feres, Haid-und neu-Strasse 14, D-7500 Karlsruhel, Fed. Rep. of Germany

[21] Appl. No.: 762,149

[22] Filed: Jan. 24, 1977

[30] Foreign Application Priority Data

Jan. 30, 1976 [DE] Fed. Rep. of Germany ....... 2603480
Dec. 21, 1976 [DE] Fed. Rep. of Germany ....... 2657956

[51] Int. Cl.² .............................................. B01D 1/22
[52] U.S. Cl. .................................. 202/236; 159/6 R; 159/DIG. 1
[58] Field of Search .................. 159/6 R, DIG. 1; 202/236

[56] References Cited

U.S. PATENT DOCUMENTS

| | | | |
|---|---|---|---|
| 2,210,927 | 8/1940 | Hickman | 159/6 R |
| 2,234,166 | 3/1941 | Hickman | 159/6 R |
| 2,755,293 | 7/1956 | McDonald | 159/6 R |
| 3,282,798 | 11/1966 | Tidball | 159/6 R |
| 3,430,690 | 3/1969 | Sciavy | 159/6 R |
| 3,507,752 | 4/1970 | Germerdonk | 159/6 R |

FOREIGN PATENT DOCUMENTS 1583466 10/1969 France .

Primary Examiner—Hiram H. Bernstein
Attorney, Agent, or Firm—Craig and Antonelli

[57] ABSTRACT

In a thin-layer evaporator having a vapor chamber and a hollow rotor mounted for rotation in such chamber, the rotor defining a chamber to receive a heat-transfer medium and one wall thereof constituting an upwardly facing, conical evaporator surface, a heating system for the heat-transfer medium is provided within the rotor and is thus in direct contact with such medium. The heating system is cylindrical in form and is of a diameter substantially equal to the outside diameter of the evaporator surface.

26 Claims, 2 Drawing Figures

EVAPORATOR

The invention relates to a thin-layer evaporator, more especially for high-boiling products, comprising a vapour chamber and a rotor, which rotates therein and which comprises a chamber for a heat-transfer medium and an evaporator surface bounding this chamber against the vapour chamber.

Such thin-layer evaporators with rotating evaporator surfaces are known in a wide variety of constructional forms. Their essential advantage consists in that the raw product, which is placed on the evaporator surface, can be distilled in an extremely thin layer and at an extremely short retention time. Such evaporators are therefore particularly for thermally sensitive products, for example in the chemical, pharmaceutical and food industries. This sparing treatment of the product is as a rule further enhanced by the fact that the vapour chamber is subjected to a medium high vacuum, that is to say that the evaporation temperature is reduced. In accordance with the required heating temperature, the heat-transfer medium is selected from fluid heat-transfer media.

The generally vaporous heat-transfer medium has to be fed into the rotating heat-transfer medium chamber from a stationary generating unit and the accumulating condensate has to be discharged against the action of the centrifugal force. This causes considerable difficulties, particularly when it is necessary, due to a high evaporation temperature of the product to be processed, for the heat-transfer medium to have a correspondingly high heating temperature. In fact, the stationary parts of the heat-transfer medium unit have to be sealed from the parts which rotate at high speed, for which purpose generally only mechanical slide ring means, comprising elastic sealing parts, are suitable. However, known sealing materials have the decisive disadvantage that they are not very resistant to the high temperature of the heat-transfer medium. The sealing problems are further increased by the fact that sealing has to be effected on large diameters and in the medium high vacuum range. Leaks are particularly serious because they may lead to the contamination of the often high-grade product through the heat-transfer medium. In many cases, thin-layer evaporators with rotating evaporator surfaces are therefore not used.

Furthermore known are thin-layer evaporators of the described construction (U.S. Pat. No. 2,210,927) where a fluid heat-transfer medium is accommodated directly in the evaporator tank and is transported with the aid of the centrifugal forces from a sump beneath the evaporator surface. The use of a fluid heat-transfer medium results, of course, in a limitation of the boiling temperature in the upward sense. On the other hand, problems arise here, too, since the product chamber cannot be sealed from the heat-transfer medium chamber or can be sealed only at great expense.

Finally, there are known thin-layer evaporators (FR Pat. No. 1,583,466) in which electric resistance heaters are arranged between the evaporator surface and a jacket, whose connections are carried to a central hollow shaft and which are supplied via a rotating current collector. Such direct heating of the evaporator surface does not allow any uniform temperature and heat distribution over the surface, on the one hand, and thus causes an undesirably large temperature gradient which easily leads to local overheating and thus to a sticking of the material, which can be eliminated only after the evaporator has been opened.

The task underlying the invention is to design a thin-layer evaporator of a construction as described at the beginning so that, along with a constructional simplification, it can be used for high-boiling and difficult products.

Proceeding from a thin-layer evaporator having a heat-transfer medium circuit, this task is solved according to the invention in that the rotor comprises a heating system for the heat-transfer medium, which is in direct contact therewith, which heating system is arranged on a diameter circle that is approximately equal to or larger than the largest diameter of the evaporator surface.

Due to the high rotational speed of the rotor, which is usual in thin-layer evaporators, the fluid heat-transfer medium forms a cylindrical ring on the external wall of the rotor and, being at that location in direct contact with the heating system, it is heated up to boiling temperature. The steam reaches the evaporator surface, where it condenses to drops, which results in a particularly favourable coefficient of heat transmission and thus a low temperature gradient on the evaporator surface. At the same time, a constant heating temperature is provided because of the constant condensation temperature. The drops forming on the evaporator surface are hurled away, due to the centrifugal force acting on them, in the direction of the externally located heating system and are immersed in the fluid ring provided at that location. There is thus provided a transport circuit for the heat-transfer medium that is closed upon itself and comprises a phase shift between the heating and condensation zones. There is therefore no need for the provision of any pumps, conduits, seals or the like for a forced circulation of the heat-transfer medium. Since there are virtually no thermal losses, a very good efficiency is achieved. The quantity of heat-transfer medium required is substantially smaller than it is in conventional equipment using a vaporous heat-transfer medium. Due to this factor and the direct effect of the heating system, it is possible to heat and cool the heat-transfer medium faster, starting and stopping times thus being reduced.

This thin-layer evaporator can be used for any kind of raw product, irrespective of the evaporation temperature thereof, since, due to the heating system being integrated in the rotor, the heat-transfer medium can be adjusted to any boiling temperature or can be selected accordingly. Compared with the equipment known so far for such applications, the purchasing costs for such a thin-layer evaporator are extremely low.

According to a preferred constructional form, the heating system is located in a cylinder plane surrounding the evaporator surface at a distance. Thus the heating system is also rotationally symmetrical in design, so that an absolutely uniform heat transport occurs within the rotor.

There are known thin-layer evaporators having a conical evaporator surface and a concentric distributor plate, which forms the bottom thereof, for the initial product. According to the invention, the rotor of such an evaporator is formed by a cylinder which comprises a bottom and near the wall of which the heating system is arranged and into which there is inserted the conically inwardly tapering evaporator surface comprising the distributor plate. There is thus provided a closed, cup-like shape of the rotor, which is favourable from the point of view of strength. There may be provided furthermore an additional support for the evaporator surface.

The heating system is advantageously formed by electrical tubular heaters which are soldered into the rotor cylinder bottom, on the one hand, and whose upper ends are fixed close to the upper front edge of the rotor cylinder, on the other hand, and whose electric connections are carried through the hollow driving shaft of the rotor to a slip ring body. Such tubular heaters have the advantage of a low cost price. Furthermore, the metal jacket tube may be made from a material that can be adapted to the chemical properties of the heat-transfer medium. Instead, it is of course also possible to install an induction heating system.

There are known thin-layer evaporators comprising a tank which includes the vapour chamber and which engages over the evaporator surface in a hood-like manner, the distillation residue being taken from the evaporator surface by means of a scooping tube, while the distillate condenses on the cool walls of the hood-shaped tank and flows off in the downward direction. The lower wall of the tank being located close to the external wall of the rotor, and thus near the heating system, provision is made according to the invention for a thermal shield to be arranged between the rotor cylinder and the tank wall that is close to it, so as to avoid any backward evaporation.

Since the aforementioned thin-layer evaporator can be operated at considerably higher temperatures than the known evaporators of similar construction, special safety precautions have to be taken. Provision is therefore made, according to the invention, for the rotor cylinder to be fastened, together with the evaporator surface, to a hollow shaft which axially penetrates the vapour chamber and which is connected to the chamber for the heat-transfer medium, on the one hand, and with its upper end, via a shaft bushing on the tank, to a condenser, which is arranged outside the tank, on the other hand. The excess heat passes through this hollow shaft into the condenser as part of the vaporous heat-transfer medium, is precipitated therein and falls back into the heat-transfer medium chamber. The condenser is advantageously designed for an excess heat of a hundred per cent. A good operational safety is thus provided. For smaller rotor heat outputs, the condensation surface may also be installed directly in the hollow shaft.

A temperature feeler and a level feeler for the heat-transfer medium may be arranged in the aforementioned tube. The level indicator provides information about the liquid and vaporous proportions of the heat-transfer medium.

A further improvement of the safety precautions can be provided by subjecting the condenser on the heat-transfer medium side to an adjustable pressure of an inert gas. This makes it possible to use heat-transfer media which must be handled with care at high temperatures or in vaporous form. The boiling temperature of the heat-transfer medium can be regulated in a simple manner by control of the pressure.

Arranged between the heat-transfer medium chamber and the connection to the hollow shaft is an overflow diaphragm, which prevents the vaporous heat-transfer medium from penetrating into the condenser. In the area of the overflow diaphragm there occurs on the evaporator surface condensation, which simultaneously exerts a throttling action relative to the pressure gradient existing between the heating chamber and the condenser.

Preferably, the hollow shaft in the vapour chamber is surrounded at a distance by a co-rotating tube, which ends, with its lower edge, above the distributor plate. The initial product can be loaded into the annular gap, provided between the hollow shaft and the tube, within the vapour chamber. This design has the advantage that the tube product runs off along the tube internal side in a film-like manner and is degassed during this process, the degassing effect being particularly good because of the turbulent thin layer.

In all, the described thin-layer evaporator provides the further advantage that it can be manufactured in an extremely compact mode of construction, the heat generator and heat consumer being combined in a single constructional part. This results in a substantial constructional simplification along with a small space requirement. Of course, it is possible to use the described evaporator not only for distillation but also, for example, for concentrating purposes in respect of short-time chemical reactions etc.

According to another embodiment of the invention, provision is made for the heating system to be the secondary winding of an induction heating system, whose primary winding is designed as a water-cooled induction coil and is arranged outside the rotor.

In contrast to tubular heaters, an induction heating system does not necessitate any electric current transmission between relatively movable parts.

According to a further development of this embodiment, the secondary winding is arranged on the periphery of a chamber which is located beneath the evaporator surface and which comprises in its centre a condenser for the dissipation of the excess heat. The condenser allows the heating temperature to be controlled in a fast responding manner. Due to the fact that the condenser is integrated in the rotor, a small compact construction is provided.

Figure 2:
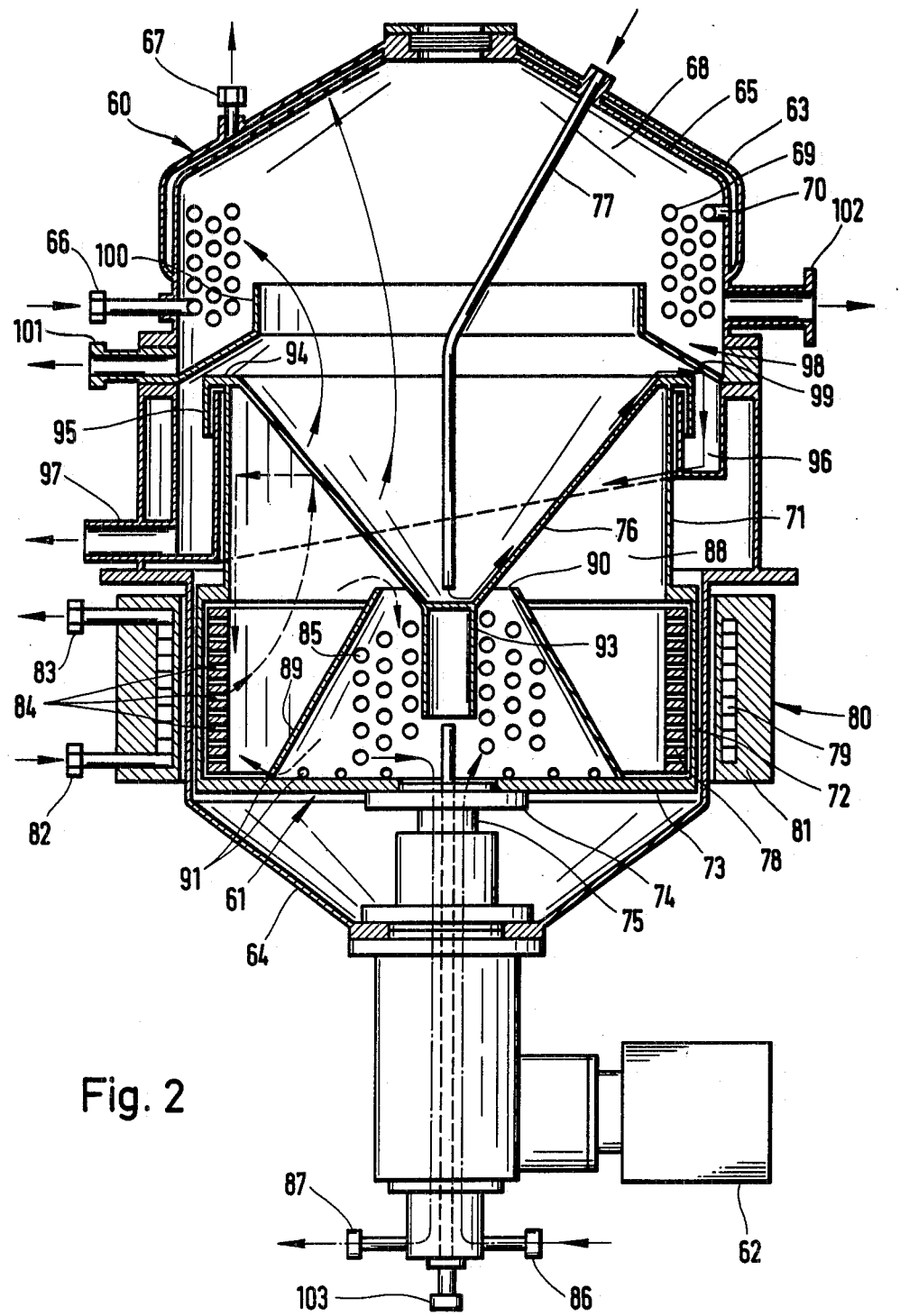

The invention will now be described further, by way of example only, with reference to the accompanying drawings in which:

FIG. 1 is a longitudinal section through a first embodiment of the invention; and FIG. 2 is a similar view to that of FIG. 1 and shows a second embodiment.

Referring now to FIG. 1, the thin-layer evaporator shown therein consists substantially of a tank 1, for example a vacuum vessel, a rotor 2 and a drive unit 3. The tank 1 is formed by a hood 4 and a tub 5, the hood 4 enclosing a vapour chamber 6. In the exemplified embodiment shown, the hood 4 has a cooling jacket 7 comprising a cooling medium inlet 8 and an outlet 9. Furthermore, the cooling jacket is provided with a sight glass 10.

The rotor 2 consists substantially of a cylinder 11 comprising a bottom 12 and an evaporator surface 13 which, in the exemplified embodiment shown, is conical in design and is indented on its upper edge to form a rim 14.

On its bottom, the evaporator surface 13 comprises a distributor plate 15 with an overflow edge 16.

The wall of the cylinder 11 and the bottom 12 thereof, as well as the evaporator surface 13, encircle a chamber 17 for a heat-transfer medium circuit. Close to the wall of the cylinder 11, there is arranged a heating system 18 which consists, in the exemplified embodiment shown, of electric tubular heaters 19. These tubular heaters 19 are arranged on a diameter circle or in a cylinder plane respectively whose diameter, in the exemplified embodiment, is larger than the largest diameter of the evaporator surface 13. The tubular heaters 19 are brought through the bottom 12 of the cylinder and soldered into the latter at 20. The upper ends of the tubular heaters 19 are fixed near the upper front edge 21 of the cylinder, for example in blind bores. The electrical connections 22 of the tubular heaters pass through a chamber 45, which is sealed from the distillate chamber 50 by means of a cover 46, through the boss 49 and through the hollow driving shaft 23 of the rotor to a slip ring body 24, to which the supply cable 25 is connected.

The chamber 17 for the heat-transfer medium circuit communicates via a hollow shaft 26, which is concentric with the rotor 2 and comprises a shaft bushing 51 and a sealing head 52, with a condenser 27, which is arranged outside the hood 4. Arranged in the hollow shaft 26 are a level feeler and a thermo-feeler 28. The shaft bushing 51 and the sealing head 52 are seated in a housing, which can be evacuated via a socket 53 for the indication of any possible leakages. The condenser 27 is supplied with cooling medium via the connections 29, 30 and comprises on its steam side a safety valve 31 as well as a pressure compensating and regulating valve 32. An inert gas can be introduced under pressure via this valve.

An inlet conduit 33, which ends between the hollow shaft 26 and a tube 34 surrounding the latter, enters the vapour chamber. Furthermore, there is arranged at the junction between the conical evaporator surface 13 and the indented rim 14 a scooping tube 35 for the distillation residue, which is also brought to the outside through the hood 4.

The hood 4 of the evaporator is lengthened towards the bottom to form an apron 36, which engages in an open-topped trough 37. The distillation outlet 38 is connected to the trough, while near the trough there is located a connecting socket 39 for a vacuum pump. Finally, there is provided between the external wall of the cylinder 11 and the hood 4 a thermal screen 40, which is concentric with the rotor and is connected to the tub 5 of the tank 1. The trough 37 is also arranged on this thermal screen 40.

During the operation of the thin-layer evaporator, the fluid heat-transfer medium is initially disposed above the bottom 12 of the cylinder 11. As soon as the rotor 2 is rotated, this fluid moves towards the wall, rises along the wall with an increasing rotational speed and finally forms, when the relatively high nominal rotational speed is reached, a fluid ring 41, which encloses the tubular heaters 19 and is indicated in the drawing. At the latest at this moment, the heating system 18 is switched on via a rotational speed monitor 47, the fluid thus gradually partly evaporating and filling the heat-transfer medium chamber 17 in the form of steam. As soon as the desired temperature has been detected via the temperature feeler 28, the initial product is loaded via the inlet tube 33, runs down as a film along the cylinder jacket 34, passes into the distributor plate 15 and is uniformly distributed on the evaporator surface 13 via the overflow edge 16. Due to the high circumferential speed, it runs to the outside in a thin layer, the more easily boiling components evaporating into the vapour chamber 6, condensing on the cooled hood-shaped jacket 4 of the tank 1 and passing via the apron 36 into the trough 37. The distillate is continuously removed via the outlet socket 38. The distillation residue is peeled from the upper edge of the evaporator surface by means of the scooping tube 35 and is transported to the outside. Within the chamber 17 for the heat-transfer medium circuit 42, 43 of the droplets which are hurled away from the evaporator surface 13 and which are returned to the heating system 18 due to the centrifugal force. Finally, a portion of the steam passes, according to the directional arrow 44, via an overflow diaphragm 48 into the hollow shaft 26 and thus to the temperature feeler and into the condenser 27. Between the overflow diaphragm and the connection to the hollow shaft 26, at least a portion of the heat-transfer medium condenses on the relatively cool evaporator surface section provided there, this small chamber thus forming a kind of throttle.

The thin-layer evaporator shown in FIG. 2 consists substantially of a tank 60, for example a vacuum vessel, a rotor 61 and a drive unit 62. The tank 60 is formed by a hood 63 and a tub 64, the hood 63 comprising a cooling jacket 65. The hood 63 encloses a vapour chamber 68, wherein a condenser 69 for the distillate is arranged. The condenser 69 has an inlet 66 and an outlet 70, which opens into the cooling jacket 65. The cooling medium passes from the cooling jacket 65 via the socket 67 to the outside.

The rotor 61 consists of two cylinder sections 71, 72 and a bottom 73, on which a hollow shaft 75 of the drive unit 62 acts via a flange 74. Secured to the upper cylinder section 71 is a conical evaporator surface 76, the product being loaded on the inner side thereof via a tube 77.

The lower cylinder section 72 comprises the secondary winding 78 of an induction heating system 80, whose primary winding 79 is arranged in a ring block 81 provided outside the evaporator. The primary winding is cooled, the cooling medium being admitted via a socket 82 and being discharged via a socket 83. The secondary winding is seated in a cylinder body, which is arranged at a short distance from the wall of the lower cylinder section 72 and which is provided with approximately radially extending bores or gaps 84.

In the centre of the lower cylinder section 72, there is arranged a control condenser 85 in the form of a nest of tubes, its inlet 86 and outlet 87 being passed through the hollow shaft 75. The heat-transfer medium chamber 88, which is enclosed on the outer side by the upper and lower cylinder sections 71, 72 and by the evaporator surface 76 as well as the bottom 73 of the rotor 61, is bounded relative to the control condenser by a locking surface 89 in the form of a conically upwardly tapering sheet metal jacket. The conical sheet metal jacket comprises on its tapered side an inlet aperture 90 and on its underside, which is secured to the bottom 73 of the rotor 61, several holes 91. The evaporator surface 76 projects into the inlet aperture 90 with its lower end or with a lug 93.

At its upper external edge, the evaporator surface 76 comprises an overflow baffle 94, which engages with an apron 95 in a cylindrical annular space 96 of the evaporator housing. At its deepest point, the annular space comprises an outlet 97 for the residue. Above the overflow baffle, there is arranged at a short distance therefrom an internal hood 98, which is fastened with its external circumference to the external hood 63 and comprises an upwardly conically rising section 99 and a cylindrical section 100, which engages on the inside in the bundle of tubes forming the condenser 69. The wall of the external hood 63 is provided with an outlet socket 101 for the distillate in the area of the lowest point of the ring channel formed by the upperside of the internal hood 98. There is furthermore provided a drain socket 102 for the vacuum.

The mode of operation of the evaporator is as follows: The fluid heat-transfer medium, which is disposed on the bottom 73 of the rotor 61, is driven to the outside when the drive unit is switched on, forming a cylindrical liquid ring in the area of the secondary winding in the lower cylinder section 72 of the rotor. The heat-transfer medium evaporates, rises to the top and condenses into drops on the heating side of the evaporator surface 76. Since the latter also rotates, the drops are hurled away and run down along the inner side of the upper cylinder section 71 until they plunge again into the liquid ring on the secondary winding 78.

The heat-transfer medium passes partly simultaneously via the inlet aperture 90 behind the locking surface 89 and to the control condenser 85, where it is condensed, the condensate accumulating on the bottom 73 of the rotor, from where it moves to the outside and passes back to the secondary winding 78 through the apertures 91. Any excess heat can be quickly carried away by a change in the cooling medium inflow to the control condenser 85. The temperature of the heat-transfer medium is controlled by the pressure of an inert gas fed into the heat-transfer medium chamber via a pressure gas line 103.

The distillate is evaporated from the product added via the conduit 77 by means of the heat given to the heating side of the evaporator surface 76 during the condensation of the heat-transfer medium steam. The steam rises into the vapour chamber 68. The distillate is precipitated on the condenser 69 and on the cooling jacket 65 of the external hood 63, and the condensate runs into the ring channel above the internal hood 98 and to the drain socket 101. The residue runs via the overflow baffle 94 into the ring chamber 96 and from there to the drain socket 97. The residue that is splashed to the outside, due to the centrifugal forces, is hurled against the inner side of the conical section 99 of the internal hood 98 and runs to the outside into the ring chamber 96, the residue and distillate thus being cleanly separated in a very confined space.

What I claim is:

1. A thin-layer evaporator, more especially for high-boiling products, comprising:
   a vapour chamber;
   a rotor rotatable therein, the said rotor comprising a sealed chamber for a liquid heat-transfer medium circuit that is closed upon itself;
   an evaporator surface separating this liquid heat-transfer medium circuit from the vapour chamber, said evaporator surface forming part of the sealed chamber; and
   a heat system for the liquid heat-transfer medium, which heating system is in direct contact with such medium only while such medium is thrown outwardly by centrifugal force produced by the rotor and which heating system is arranged on the periphery of the sealed chamber
   whereby the liquid heat-transfer medium circuit comprises a phase shift of the liquid heat-transfer medium from evaporation by the heating system to condensation adjacent the evaporator surface and back again.

2. A thin-layer evaporator as claimed in claim 1, characterised in that the heating system is located in a cylindrical surface that surrounds the evaporator surface in spaced disposition relative thereto.

3. A thin-layer evaporator as claimed in claim 1, comprising a conical evaporator surface and a concentric distributor plate, forming the bottom of the latter, for the initial product, characterised in that the rotor is formed by a cylinder with a bottom, near whose wall the heating system is arranged and into which the conically inwardly tapering evaporator surface with the distributor plate is inserted.

4. A thin-layer evaporator as claimed in claim 1, characterised in that the heating system is formed by electric tubular heaters, which are soldered into the bottom of the rotor cylinder, on the one hand, and which are fixed with their upper ends near the upper front edge of the rotor cylinder, on the other hand, and whose electrical connections are carried through the hollow driving shaft of the rotor to a slip ring body.

5. A thin-layer evaporator as claimed in claim 1, comprising a tank having a hood portion which engages over the evaporator surface, characterised by a thermal screen arranged between the rotor cylinder and the adjacent tank wall.

6. A thin-layer evaporator as claimed in claim 1, characterised in that the rotor cylinder is secured, together with the evaporator surface, to a hollow shaft which axially penetrates the vapour chamber and which communicates with the chamber for the heat-transfer medium, on the one hand, and is connected with its upper end to a condenser.

7. A thin-layer evaporator as claimed in claim 6, characterised in that the condenser is arranged in the hollow shaft within the vapour chamber and is supplied with cooling medium via conduits penetrating the tank.

8. A thin-layer evaporator as claimed in claim 6, characterised in that the condenser is arranged outside the evaporator and is connected to the hollow shaft via a shaft bushing on the tank.

9. A thin-layer evaporator as claimed in claim 6, characterised in that a temperature feeler and a level feeler for the heat-transfer medium are arranged in the hollow shaft.

10. A thin-layer evaporator as claimed in claim 6, characterised in that on the heat-transfer medium side the condenser stands under the adjustable pressure of an inert gas.

11. A thin-layer evaporator as claimed in claim 6, characterised in that an overflow diaphragm is arranged between the chamber for the heat-transfer medium circuit and the connection to the hollow shaft.

12. A thin-layer evaporator as claimed in claim 6, characterised in that the hollow shaft in the vapour chamber is surrounded at a distance by a co-rotating tube, which ends with its lower edge above the distributor plate, and in that the initial product is loaded into the annular gap provided within the vapour chamber between the hollow shaft and the co-rotating tube.

13. A thin-layer evaporator as claimed in claim 1, charactericed in that the heating system is the secondary winding of an induction heating system, the said induction heating system having a primary winding designed as a water-cooled induction coil and arranged outside the rotor.

14. A thin-layer evaporator as claimed in claim 13, characterised in that the secondary winding is arranged on the periphery of a chamber beneath the evaporator surface which chamber comprises in its centre a condenser for the dissipation of the excess heat from the heat-transfer medium.

15. A thin-layer evaporator as claimed in claim 13, characterised in that the rotor consists of two cylinder sections, the upper one of which forms the heat exchange chamber between the heat-transfer medium and the evaporator surface bounding this chamber against the vapour chamber, while the lower cylinder section comprises the secondary winding and the condenser for the dissipation of the excess heat from the heat-transfer medium.

16. A thin-layer evaporator as claimed in claim 13, characterised in that the secondary winding is arranged in a cylinder body and is at a small distance from the wall of the lower cylinder section and in that approximately radially directed apertures are provided in the cylinder body.

17. A thin-layer evaporator as claimed in claim 14, characterised in that the rotor comprises in its lower cylinder section a coaxial locking surface having a smaller diameter than that of the secondary winding and in that the condenser is arranged within the locking surface.

18. A thin-layer evaporator as claimed in claim 17, characterised in that the locking surface tapers conically towards the top and is secured to the rotor bottom and comprises on its upper front end an inlet aperture for the heat-transfer medium steam, which takes along the excess heat, and on its lower front end, near the rotor bottom, apertures for the outlet of the condensed heat-transfer medium into the lower cylinder section of the rotor.

19. A thin-layer evaporator as claimed in claim 17, characterised in that the evaporator surface is conical in form and projects with its lower end or with a lug arranged thereon into the space bounded by the locking surface.

20. A thin-layer evaporator as claimed in claim 14, characterised in that the condenser consists of a nest of tubes concentric with the rotor and having inlet and outlet means passing to the outside through the bottom of the rotor and a hollow shaft driving the rotor.

21. A thin-layer evaporator as claimed in claim 17, characterised in that a pressure gas line, comprising a regulating element for controlling the pressure prevailing in the heat-transfer medium chamber of the rotor, extends into the space enclosed by the locking surface.

22. A thin-layer evaporator as claimed in claim 13, characterised in that the conical evaporator surface comprises on its upper external diameter an overflow baffle for the distillation residue, which passes into a cylindrical ring chamber which extends downwardly towards an outlet, and in that a hood, which has a conical section that rises inwardly and has a cylindrical section that is open at the top, for transferring the distillate to the vapour chamber located thereabove, is arranged at a short distance above the overflow baffle.

23. A thin-layer evaporator as claimed in claim 22, characterised in that a distillate condenser is arranged in the vapour chamber, on the external circumference thereof, and above the hood.

24. A thin-layer evaporator as claimed in claim 23, characterised in that the upper side of the hood is inclined, sloping from the interior to the exterior downwardly towards an outer vertical wall of the evaporator, and in that a socket for the outlet of the distillate is arranged on the external hood circumference, said hood circumference being attached to the evaporator wall below the socket.

25. A thin-layer evaporator as claimed in claim 1, characterized in that the heating system is arranged on the periphery of the sealed chamber which has a diameter circle approximately equal to or larger than the largest diameter of the evaporator surface.

26. A thin-layer evaporator as claimed in claim 1, characterized in that the sealed chamber is partly filled with the liquid heat-transfer medium.

* * * * *